United States Patent [19]
Eiberger et al.

[11] Patent Number: 5,943,090
[45] Date of Patent: Aug. 24, 1999

[54] METHOD AND ARRANGEMENT FOR CORRECTING PICTURE STEADINESS ERRORS IN TELECINE SCANNING

[75] Inventors: Berthold Eiberger, Ober-Ramstadt; Arno Beckenbach, Eich; Kurt-Heiner Philipp, Heppenheim; Andreas Löw, Gross-Gerau; Broder Wendland, Dortmond; Thomas Herfet, Herne; Thomas Bonse, Dortmund; Wolfgang Paschedag, Dortmund; Thomas Leonard, Schwerte, all of Germany

[73] Assignee: U.S. Philips Corporation, New York, N.Y.

[21] Appl. No.: 08/715,947

[22] Filed: Sep. 19, 1996

[30] Foreign Application Priority Data

Sep. 30, 1995 [DE] Germany .......................... 195 36 691

[51] Int. Cl.⁶ ..................................................... H04N 3/36
[52] U.S. Cl. .............................................. 348/97; 348/96
[58] Field of Search .................................. 348/94, 95, 96, 348/97, 98, 100, 699, 101, 105, 446, 416; 345/527; H04N 5/253, 7/18, 7/36, 3/36

[56] References Cited

U.S. PATENT DOCUMENTS

| | | | |
|---|---|---|---|
| 4,104,680 | 8/1978 | Holland | 358/132 |
| 4,325,077 | 4/1982 | Dunham | 348/96 |
| 4,661,846 | 4/1987 | Kondo | 348/416 |
| 4,661,849 | 4/1987 | Hinman | 348/416 |
| 4,875,102 | 10/1989 | Poetsch | 348/97 |
| 4,903,131 | 2/1990 | Lingemann et al. | 348/97 |
| 5,027,205 | 6/1991 | Avis et al. | 348/699 |
| 5,157,732 | 10/1992 | Ishi et al. | 348/699 |
| 5,194,958 | 3/1993 | Pearman et al. | 358/214 |
| 5,365,280 | 11/1994 | De Haan et al. | 348/699 |
| 5,384,912 | 1/1995 | Ogrinc et al. | 345/527 |
| 5,402,166 | 3/1995 | Mead et al. | 348/96 |
| 5,430,489 | 7/1995 | Richards et al. | 348/446 |
| 5,475,423 | 12/1995 | Eiberger | 348/97 |
| 5,510,834 | 4/1996 | Weiss et al. | 348/699 |

FOREIGN PATENT DOCUMENTS

2187913  9/1985  United Kingdom .

*Primary Examiner*—Tommy P. Chin
*Assistant Examiner*—Gims S. Philippe
*Attorney, Agent, or Firm*—Gregory L. Thorne

[57] ABSTRACT

A method of correcting picture steadiness errors (or film weave correction) in telecine scanning is proposed, in which, in a first step, at least one sample area of the picture contents of the video signal obtained by film scanning is determined by way of structure recognition, this sample area corresponding to a curvature in the picture contents. In a second step, it is checked, by way of comparison, whether the determined sample areas are recognizable in a search area of the sequential frame. In a third step, motion vector signals are generated when the sample areas are recognized again in the sequential frame, these motion vector signals defining the direction of motion and the extent of deviation of the position of the determined sample area from the position of the recognized sample area. In a fourth step, parameters of a transform function are determined by the motion vector signals. In a subsequent fifth step, motion vectors, which correspond to partial motions, are recognized and eliminated by comparing the transform function with the motion vectors. Steps four and five are performed several times, if necessary. In a sixth step, correction signals are derived by taking the temporal sequence of transform functions into account, and in a seventh step, these correction signals are applied to a control device, these correction signals correcting the stability errors in the picture signals.

23 Claims, 3 Drawing Sheets

FIG. 5

METHOD AND ARRANGEMENT FOR CORRECTING PICTURE STEADINESS ERRORS IN TELECINE SCANNING

BACKGROUND OF THE INVENTION

1. Field of the Invention

The invention relates to a method of correcting picture steadiness errors in telecine scanning, in which method light modulated by film frames is converted into a video signal and in which, with reference to the frame position, the picture component in the video signal is corrected by means of a correction signal. The invention also relates to an arrangement for performing the method.

A film scanner converts the optical frames stored on a film into a video signal. To obtain a video signal with picture contents which are free from steadiness errors, each film frame should be mechanically positioned in exactly the same way during the scanning process and the illumination process. The single film frames are usually positioned by means of a pin registration, in which the position of sprocket holes at the edges of the film is detected and evaluated. However, due to mechanical inaccuracies, the pin registration yields imperfect results so that more or less disturbing horizontal, vertical, translatory and/or rotary picture steadiness errors are visible in the displayed video image. Some of these picture steadiness errors are based on reasons of principle, for example, those picture steadiness errors which are due to damage of the sprocket holes, irregularities of the film, splices in the film, fluctuations of the film feed speed, or film abrasion in the sprocket holes.

2. Description of the Related Art

To eliminate picture steadiness errors in telecine scanners based on the flying spot principle, it has been proposed (U.S. Pat. No. 4,104,680) to optically scan the edges of the sprocket holes in the horizontal direction and to derive a correction signal from the generated edge signal. The correction signal shifts the horizontal deflection of the scanning beam of a scanning tube projecting a TV frame on the film to be scanned. However, this correction method cannot be used in film scanners with CCD line sensors scanning the film. A further drawback of the optical sprocket hole scanning is that, even when the exact spatial position of the sprocket holes is determined, the position of the individual film frames cannot be determined with the desired accuracy of approximately +/−0.1 times the height of a line, because the standard itself already allows larger positional deviations between the sprocket holes and the film frames. It can be concluded that frame stabilization results can be considered to be unsatisfactory if the signal for correcting picture steadiness errors is derived in accordance with a method in which the position of sprocket holes as a reference for positioning the film frames is used in the telecine scanning process.

U.S. Pat. No. 5,194,958 discloses a method of correcting picture steadiness errors (or film weave correction) in which a correction signal for frame stabilization is derived from L-shaped marks provided on the film in gaps between adjoining frames. The correction signal controls a video signal processor, for example, a digital video-effect apparatus. Since commercially available films are not provided with L-shaped marks, only special films can be corrected for picture steadiness by means of this known method.

United Kingdom Patent GB 2,187,913A also discloses a device for detecting picture steadiness errors, in which a motion vector measuring circuit derives displacement signals from the video signal of the film scanner, these displacement signals representing the horizontal and vertical offset between successive frames. The displacement signals control a 2-dimensional interpolator which interpolates the video signal of the film scanner, while excluding the frames whose motion contents are based on a frame offset, a frame magnification or diminution, or a scene of changes. In the motion vector measurement, distinctions between neighboring pixels within a line, as well as distinctions between neighboring lines and frames are determined. To generate a correction signal representing a steadiness error, the displacement signals derived in the motion vector measuring circuit are subjected to a computation based on a concise Taylor expansion. The drawback of the known device is that it is not suitable for stabilizing the frame position to a sufficiently accurate extent. However, a particular drawback is that a correction signal is prevented from being generated when there is a multitude of given picture contents.

SUMMARY OF THE INVENTION

It is an object of the invention to provide a method and an arrangement of the type described in the opening paragraph, in which the generation of a signal allows a very accurate film weave correction.

According to the invention, this object is solved in that, in a first step, at least one sample area of the picture contents of the video signal obtained by film scanning is determined by way of structure recognition, this sample area corresponding to a curvature in the picture contents, in that, in a second step, it is checked, by way of comparison, whether the determined sample areas are recognizable in a search area of the sequential frame, in that, in a third step, motion vector signals are generated when the sample areas are recognized again in the sequential frame, these motion vector signals defining the direction of motion and the extent of deviation of the position of the determined sample area from the position of the recognized sample area, in that, in a fourth step, parameters of a transform function are determined by the motion vector signals, in that, in a subsequent fifth step, motion vectors which correspond to partial motions are recognized and eliminated by comparing the transform function with the motion vectors, in that steps four and five are performed several times, if necessary, in that, in a sixth step, correction signals are derived by taking the temporal sequence of the transform functions into account, and in that, in a seventh step, these correction signals are applied to a control device, these correction signals correcting the stability errors in the picture signals.

The method according to the invention has the advantage that, independent of the location of the sprocket holes or special marks on the film, a signal for precision correction of steadiness errors can be derived directly from the picture contents of the film frames. The only reference is the degree of motion of curvatures in the picture contents of the frames stored on the film. It is particularly advantageous that the use of the method according to the invention even allows a reliable detection of picture steadiness errors when the entire picture contents change from frame to frame by a camera pan or by changing the zoom setting of the camera.

To exclude ambiguous results based on motion measurements in periodically structured picture areas, or frequently recognized sample areas in the search area, a further embodiment of the method according to the invention is characterized in that, prior to performing the second step, a signal corresponding to the determined sample area is subjected to a low-pass filtering operation.

An advantageous arrangement for performing the method according to the invention comprises a device for generating a structure signal, this device having an input to which the video signal of the film scanner is applied, and an output from which a structure signal can be supplied which represents detected edges in the picture contents of the applied video signal; a device which recognizes samples in the picture contents characterized by the structure signal in a sequential frame; a device for generating a motion vector signal in dependence upon the direction and the extent of deviation of the position of detected edges from the position of recognized edges in the larger search area; and a device for deriving a signal for correcting steadiness errors, this device having an input to which the generated motion vector signal is applied and an output from which the signal for correcting steadiness errors can be supplied.

An advantageous embodiment of an edge detector comprises a first delay device having an input and an output, in which the input receives a digital video signal; a second delay device having an input and an output, in which the input is connected to the output of the first delay device, a first device for generating derivatives in the X and Y directions, having three inputs and three outputs, in which the inputs are connected to inputs and outputs of the first and second delay devices, and in which a video signal differentiated in the X direction can be supplied from a first output, a video signal differentiated in the Y direction can be supplied from a second output, and a sign signal can be supplied from a third output; a first device for squaring the video signal differentiated in the X direction; a second device for squaring the video signal differentiated in the Y direction; a first device for multiplying the video signal differentiated in the X and Y directions; a third delay device having an input and an output, in which the input receives a signal (kxx) generated by the first device for squaring the video signal; a fourth delay device having an input and an output, in which the input is connected to the output of the third delay device; a second device for generating derivatives in the X and Y directions, having three inputs and one output, in which the inputs are connected to inputs and outputs of the third and fourth delay devices, and in which a signal (ksxx) differentiated in the X direction can be supplied from the output; a fifth delay device having an input and an output, in which the input receives a signal (kxy) obtained from the device, as well as the sign signal; a sixth delay device having an input and an output, in which the input is connected to the output of the fifth delay device; a third device for generating derivatives in the X and Y directions, having three inputs and one output, in which the inputs are connected to inputs and outputs of the fifth and sixth delay devices, and in which a signal (ksxy) differentiated in the X, Y direction can be supplied from the output; a seventh delay device having an input and an output, in which the input receives a signal (kyy) obtained from the device; an eighth delay device having an input and an output, in which the input is connected to the output of the seventh delay device; a fourth device for generating derivatives in the X and Y directions, having three inputs and one output, in which the inputs are connected to inputs and outputs of the seventh and eighth delay devices, and in which a signal (ksyy) differentiated in the Y direction can be supplied from the output; a third device for squaring the signal (ksxy) generated by the third device for generating derivatives in the X and Y directions; a second device for multiplying the signal (ksxx) generated by the second device for generating derivatives in the X direction and the signal (ksyy) generated by the fourth device for generating derivatives in the X direction; and a device for generating the structure signal, having two inputs and one output, in which one input receives the signal (ksxy) generated by the third squaring device and the other input receives the signal (ksyy) generated by the second multiplier device, and in which the structure signal can be supplied from the output.

The embodiment of a block matching arrangement for generating the motion vector signal advantageously comprises a control device having inputs and outputs, in which one of the inputs receives the structure signal, and the motion vector signal can be supplied from one of the outputs; a first block matcher having a video signal input which receives a temporarily stored downsampled video signal, a position signal input which receives a downsampled structure signal, and an output from which a first motion vector signal can be supplied; a second block matcher having a video signal input which receives a temporarily stored non-down-sampled video signal, a position signal input which receives the first motion vectors signal; and an output from which a second motion vector signal can be supplied; and a third block matcher having a video signal input which receives a temporarily stored, delayed, non-down-sampled video signal, a position signal input which receives the second motion vector signal, and an output from which a third motion vector signal can be supplied, this third motion vector signal being applied to one of the inputs of the control device.

These and other aspects of the invention will be apparent from and elucidated with reference to the embodiments described hereinafter.

Identical components are denoted by the same reference signs in the Figures.

DESCRIPTION OF THE PREFERRED EMBODIMENTS

Figure 1:
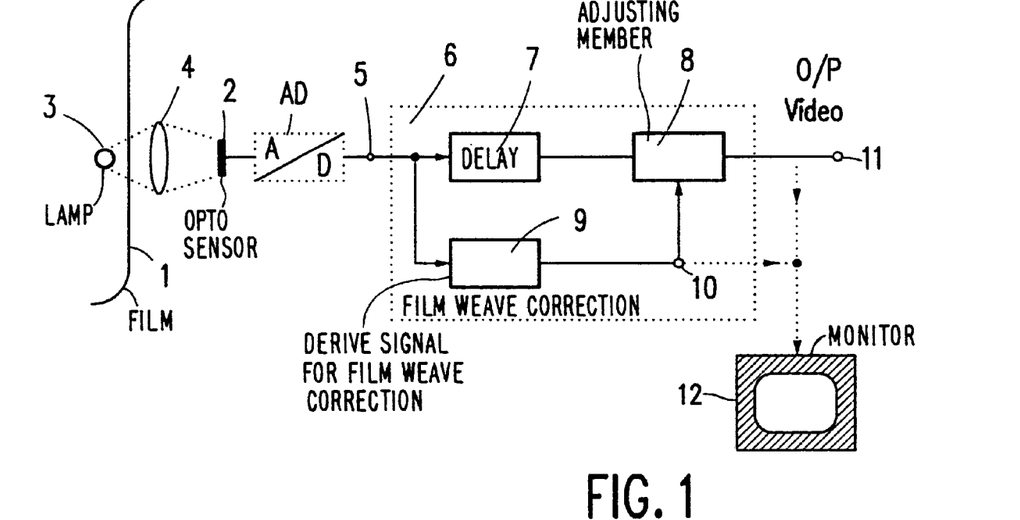
FIG. 1 shows, diagrammatically, a film scanner with a device for electronic stabilization of the frame position.

FIG. 1 diagrammatically shows a film 1, which is transported at a uniform speed along an optoelectronic sensor 2. The sensor 2 may be, for example, a CCD line. During film transport, the light from a lamp 3 illuminates the film 1. A lens 4 focuses the light passing through the film 1 onto the sensor 2. An analog video signal which is beset with picture steadiness errors can be supplied from an output of the sensor 2. This video signal is applied to the input of a device 6 for correcting picture steadiness errors (film weave correction) via a terminal 5, preferably with the interposition of an A/D converter AD.

It is conventional practice to pick up the information for the red, green and blue color components by means of a sensor for each component. To increase the resolution, not only a single CCD line sensor is used per line in CCD film scanners, but four CCD line sensors are used which are offset with respect to each other and have a slight overlap. The luminance is scanned in a HDTV format and the chrominance is scanned in a standard format. The chrominance is represented by three RGB components.

For the further signal processing method, it is assumed that four independent data streams are available which are processed in separate identical channels. The following description refers to one of these channels.

The film weave correction device 6 comprises a signal delay device 7, an adjusting member 8, and a device 9 for deriving a signal for film weave correction. The video signal, which is beset with steadiness errors and can be supplied from the terminal 5, is present at an input of the signal delay device 7 and at an input of the device 9 for deriving a signal for film weave correction. The signal delay device 7 is used for adapting the delay time of the steadiness error video signal to the signal delay time of the device 9. It is, of course, also possible to perform a temporal equalization by delaying the data transfer times of a digital video signal in a corresponding manner.

The steadiness error video signal, which can be supplied from an output of the signal delay device 7, is applied to the signal input of an adjusting member 8. A set input of the adjusting member 8 conveys a correction signal which can be supplied from an output terminal 10 of the device 9 for deriving a signal for film weave correction. The adjusting member 8 supplies a video signal which is free from steadiness errors at an output terminal 11.

The adjusting member 8 may be, for example, a known video-effect apparatus which, dependent on the adjusting signal, corrects translatory movements, horizontal and vertical size errors, rotatory errors around a determined point of rotation, distortion errors (fisheye effects) or linearity errors (higher-order errors).

A monitor 12 is provided so as to monitor the correction signal made available at the output terminal 10, or the video signal supplied from the output terminal 11 and now being free of steadiness errors. The input of the monitor 12 may be optionally connected to the output terminal 10 or 11.

Figure 3A:
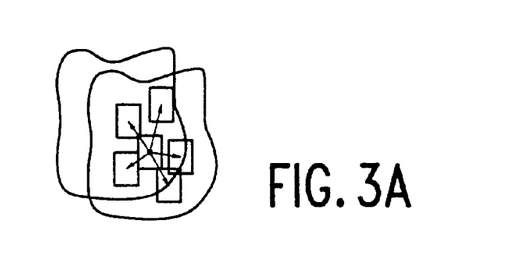
FIGS. 3A–3C are diagrammatic represntations to explain the motion measurement.

A useful structure signal suitable for deriving motion vectors cannot be generated from unstructured picture areas (FIG. 3A). Unstructured picture areas cannot be found in the picture contents of a time-sequential frame. The usability of the structure signal generated by the edge detector thus decisively depends on the picture contents of the video signal which is available. Motion vectors which have been determined are also dependent on the noise of the film material used.

Figure 3B:
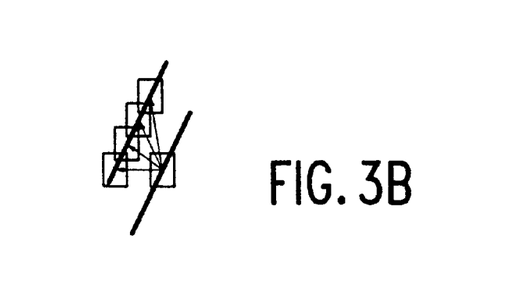

Motion measurements at the edges neither lead to unambiguous results. Speed components of a structured picture area can only be sensibly determined perpendicularly to an edge (FIG. 3B).

Figure 3C:
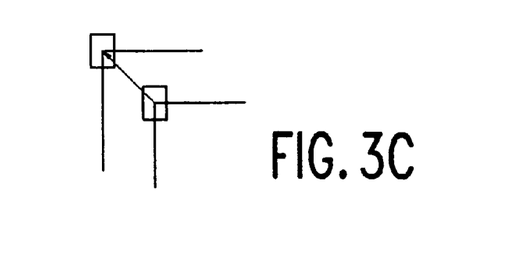

In contrast, exact motion vectors can be determined with great probability of structured picture areas which are based on edges or curvatures (FIG. 3C).

An edge is hereinafter understood to be a general curvature, rather than the ideal edge of a rectangle.

Global displacement parameters are determined in several steps. Initially, the motion vectors found can be combined by means of clustering. A (least-square) approximation is then to be applied to the cluster set found so as to determine model parameters for a transform function. The transform function found should then be compared with the set of clusters so as to recognize and eliminate partial displacements. Based on the remaining clusters, the parameters should be determined again. The iteration should be performed until the deviations between the single clusters and the transform function fall below a threshold.

In most cases, a moving object will have several detectable curvatures, so that there is redundancy in so far as the object only makes a translatory movement. Subsequently, a transform is to be computed, which reflects all motion vectors and provides information on the displacement for the locations in the frame, at which there is no motion vector. For the purpose of computation, the motion vectors are to be used as samples. When a small object has many samples, it should be taken into greater account than a large object with few samples. Redundancies at such samples can be eliminated by clustering the motion vectors. It is particularly advantageous to combine the determined motion vectors by means of a partitioned cluster algorithm.

A motion vector is composed of the four scalar quantities, namely, the x and y coordinates of the field point and the displacement in the x and y directions. The displacement vector should be considered as a point in a four-dimensional space. Each displacement vector should also be given a quality value. In order to find a useful spacing function, the four-dimensional space should first be normalized so that both the displacement vectors and the clusters can be considered as points in the same space. A cluster is then understood to be a set of displacement vectors. A new center of gravity is computed for the cluster from associated elements. The association of sets is advantageously performed by using fuzzy sets. In this way, it is possible to associate a displacement vector with a plurality of clusters. The computation of cluster centers should not only include the normalized association function, but also quality thresholds of the motion vectors as weighting factors so as to exclude that extremely poor vectors have a decisive effect on the cluster center and distort the result. A quality threshold, here resulting from the maximum value of quality thresholds of all associated motion vectors, is associated with the clusters, similarly as for the motion vectors.

The set of clusters not only comprises the displacements of the overall frame, but also those describing motion of single objects. Also, virtual displacements, caused by uncovering or covering objects, are comprised in the set of clusters. In order to find a global picture displacement, as stated hereinbefore, object displacements and virtual displacements must be eliminated. Such displacements can be recognized by comparing an approximation solution with the clusters. The clusters which deviate considerably from the approximation solution are removed. Subsequently, a new approximation solution should be determined from the remaining set of clusters. A measure of deviation between a cluster and the approximation solution is the euclidic space, normalized by its mean value, between the approximation and the cluster. A determined value of one means that the space corresponds to the average space between all clusters of the approximation. If this normalized space is larger than a given threshold, the corresponding cluster is eliminated. The threshold value should be between 1.2 and 1.5. If the threshold value is chosen to be smaller, more clusters will be eliminated.

The displacement of the edges of the picture plane can be determined from the transform function. A maximum displacement can then be indicated. The time sequence of displacing the picture edges should be applied to a temporal filtering operation. The result of the temporal filtering operation is a nominal displacement for each edge. The correction displacement for each picture edge results after integration from the difference between the nominal displacement and the actual displacement. This mode of frame stabilization smoothes the course of the global picture displacement, so that film frame sequences based on a panning movement of the camera can be displayed without jerks.

The human eye is used to observing objects which, because of their mass, move only with a finite acceleration, i.e., objects which move steadily. Discontinuities, as may occur in a change of scenes or at splices in the film, are considered as being anomalous. However, this observation behavior does not mean that no jumps may occur. To take this contradiction into account, a switchable filter is advantageously used which passes a signal which is possibly uninfluenced at the start of a scene and does not build up a low-pass characteristic until after a plurality of frames, for example, twenty frames. This behavior is realized by means of a filter structure in which the number of coefficients used accumulates.

Splices in the film material generate discontinuous signal variations of limited length. Such discontinuities can be recognized with a predictor which has the same filter structure; only different coefficients should then be used. A transversal filter arrangement with serial registers may therefore be jointly used for both the low-pass filter and the predictor.

The filter is not required for stabilizing stills; instead, zero is constantly applied as a nominal displacement.

After the correction transforms have been computed, they should be used for the input sequence. To this end, the position in the input picture, from which the picture information should come, is determined for each pixel in the transformed output picture. Usually, this position is not exactly at the location of a pixel but between pixels. Therefore an oversampled filter matrix should be applied at this position in the input picture and the luminance and chrominance values of the output picture should be determined.

It is particularly advantageous to use a high resolution spline (spline=sub-pixel line) as the filter matrix which is separably imaged in the filter matrix. For example, a normalization can then be performed which yields the sum of the actually used coefficient of one, independent of the fact where the filter matrix is used in the input picture.

Figure 2:
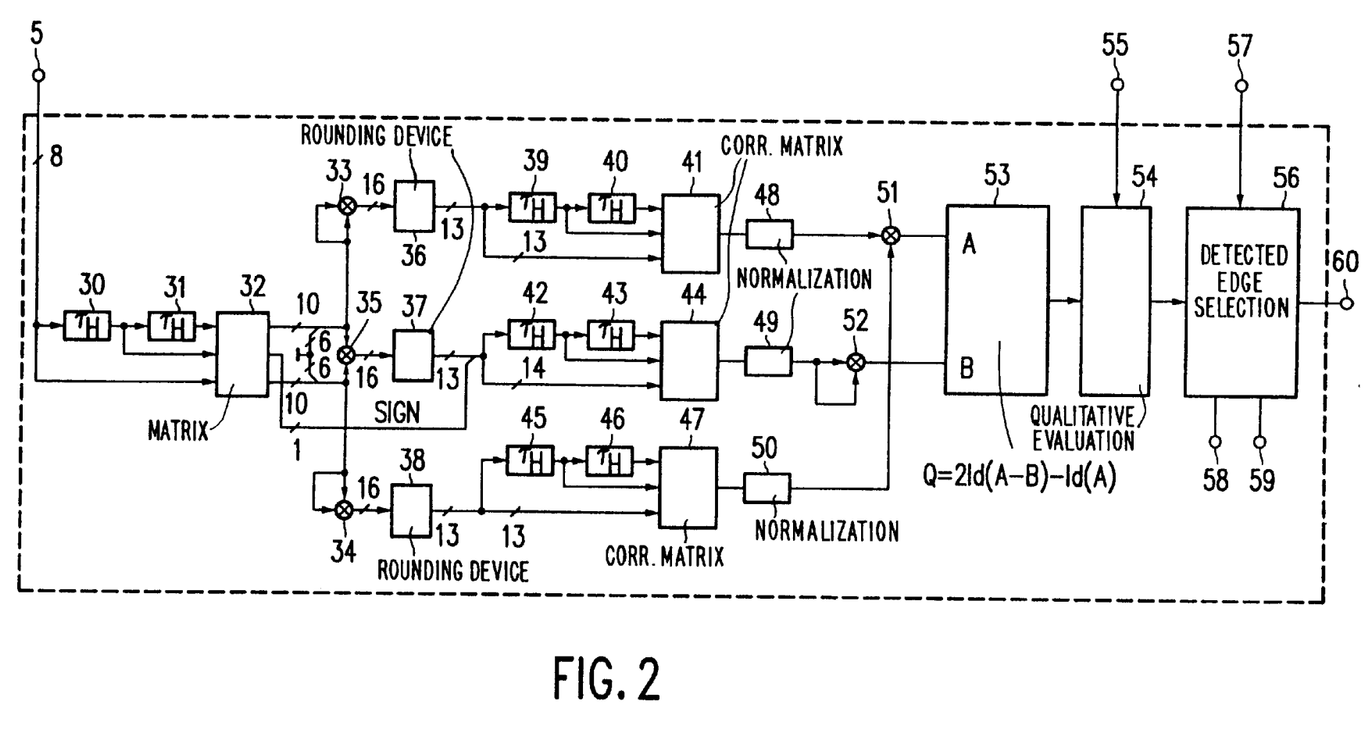
FIG. 2 shows the block diagram of an edge detector.

FIG. 2 shows a block diagram of an edge detector. Eight-bit data words of the luminance components of a digital video signal are present at an input (terminal 5) of the edge detector. The data words are applied at a data rate of 30 Mbyte/s to a series arrangement of two delay devices 30 and 31 which delay the data words each time, by one line period. The inputs and outputs of the two line delays 30 and 31 are connected to inputs of a matrix 32. The arrangement comprising the circuit elements 30 to 32 computes the derivatives in the X and Y directions in a limited pixel area. Vertical and horizontal lines on the pixel plane are detected by means of this measure. Luminance signals differentiated in the X and Y directions, as well as a sign signal can be supplied from outputs of the matrix 32. The differentiated luminance signals have a data word length of ten bits.

The luminance signal differentiated in the X direction is applied to the two inputs of a multiplier 33, and the luminance signal differentiated in the Y direction is applied to the two inputs of a multiplier 34. One of the two differentiated luminance signals is present at the respective inputs of a further multiplier 35. The multipliers 33 and 34 square the differentiated luminance signals which are present; absolute values of the signals are formed which are supplied in a word length of sixteen bits. A cross-product signal having a word length of sixteen bits is made available at the output of the multiplier 33. The cross-product of the derivatives may be considered as a cross-correlation.

The word lengths of the signals obtained are subsequently limited to thirteen bits in rounding devices 36, 37 and 38. A signal kxx supplied by the rounding device 36 is delayed by two lines periods, by means of delay devices 39 and 40. The non-delayed signal, the signal delayed by one line period and the signal kxx delayed by two line periods are applied to inputs of a first correlation matrix 41. A signal kxy supplied by the rounding device 37 is delayed by two line periods by means of delay devices 42 and 43. The nondelayed signal, the signal delayed by one line period, and the signal kxy delayed by two line periods are applied to inputs of a second correlation matrix 44. A signal kyy supplied by the rounding device 38 is delayed by two line periods by means of delay devices 45 and 46. The non-delayed signal, the signal delayed by one line period, and the signal kyy delayed by two line periods are applied to inputs of a third correlation matrix 47. The arrangement comprising the elements 39 to 47 determines given correlations in a larger range. The gradients at the edges strongly correlate with each other when all gradients point in one direction. In contrast, the gradients at edges correlate only to a small extent because the gradients point in different directions; a small cross-product is obtained.

In the further course of signal processing, the quality q of the picture data ksxx, ksxy and ksyy present in words of sixteen bits at the correlation matrices 41, 44 and 47 is examined.

The values of the picture data ksxx, ksxy and ksyy are first normalized in stages 48, 49 and 50 after which the various multiplications are performed. The picture data ksxx and ksyy are applied to inputs of a multiplier 51 which supplies picture data mxx,yy. The picture data ksxy are applied to the two inputs of a multiplier 52 which supplies the picture data mxy,xy. The values of the picture data thus generated are processed in a stage 53 in accordance with the following equation:

$$2*ld(mxx,yy-mxy,xy)-ld(mxx,yy)$$

The logarithm functions are then realized in that the floating point presentation is initially normalized and subsequently, only the exponents of the representation are used. The result of this computation is applied to a stage 54.

Dependent on the value of a key signal present at an input terminal 55, the stage 54 performs a qualitative evaluation of the data values of the edges detected so far. The key signal characterizes the shape and/or location of one or more frame masks manually selected by an operator so as to exclude, for example, given picture structures in the displayed video picture from the edge detection, or to prefer these structures. In a stage 56 following the stage 54, the remaining values of the detected edges can be further selected by means of threshold value data applied to an input terminal 57. The threshold value data denote level values which, upon exceeding or falling below the data values of the edges, influence their further routing. The threshold value data are also applied manually by an operator who has to judge the displayed video pictures on the picture structures distributed in these pictures.

As a temporal reference, the stage 56 receives a line start signal present at a terminal 58 and a frame start signal present at a terminal 59. The edge signal, which can be supplied from an output terminal 60, is processed in such a way that maximally, one recognized edge remains of the picture contents of two lines, which edge is further examined on the presence of motion by a subsequent block matcher.

The edge detector in FIG. 2 represents a correlation filter for a given point (x,y). By virtue of line-sequential processing, it is advantageously possible to form derivatives for a full line and store correlation products in three memories having a storage capacity of three lines each. After three lines, the evaluation starts.

As stated hereinbefore, the derivatives in the X and Y directions are formed with matrices (Sobel operators), from which the correlation products are computed. Values for one line each are then computed and stored in a correlation memory. After the data values of three lines have been stored, thus after a total of five picture lines have been processed, the correlation sum can be formed via a three*three block. If the correlation sum ksxx(x,y) or ksyy (x,y) results in the value of zero, the edge detection ends at this point. Since all derivatives or gradients are zero, there can be no curvature. In the further processing operation, the quality can be computed. After a block has been processed, the data values of the edges are converted into logarithmic values and then applied to the block match matcher for the purpose of motion measurement.

The quality of edge detection decisively depends on the picture contents. The more structured the picture contents, the better sample areas (edges) can be recognized, which indirectly influence the quality of frame stabilization. By manipulating the video signal applied to the edge detector, the structuring of the picture contents can be improved. An advantageous measure of improving the possibility of evaluating the structuring of the picture contents is that, for determining the sample area, individual and/or several signal components of the video signal obtained by film scanning are influenced in amplitude as against other signal components in the video signal. A further possibility consists in that, for determining the sample area, given color components of the video signal obtained by film scanning are matrixed with selectable coefficients. It is further advantageous that, for determining the sample area, given signal components of the video signal obtained by film scanning are treated differently with respect to the gamma distortion. Another possibility consists in that, for determining the sample area, the amplitude variation of given signal components of the video signal obtained by film scanning is influenced differently from the other signal components.

It is particularly advantageous that, for determining the sample area, the video signal obtained by film scanning is subjected to a spatial and/or temporal filtering operation. Due to the spatial filtering, which may comprise a high-pass, bandpass and/or low-pass filtering of the available video signal, two-dimensional picture structures at the video level can be selected. A three-dimensional filtering can be realized by taking temporally adjacent pictures into account. For example, by low-pass filtering of the video signal via a plurality of fields, given, fine picture structures disturbing the edge detection may be suppressed.

Moreover, it is advantageous that given areas in a television picture produced by displaying the video signal obtained by film scanning are excluded or not excluded from a signal processing operation for determining the sample area. Given picture areas in a displayed television picture of the video signal obtained by film scanning can be selected by masking, or may be automatically excluded from determining the sample area, dependent on the picture structure of the picture contents of the video signal obtained by film scanning, while the picture structures in the picture contents of the video signal obtained by film scanning are first evaluated, subsequently quality values are fixed for the picture areas covered by the evaluation and finally the picture area associated with the quality value is either taken into account or excluded when determining the sample area, dependent on the extent of the fixed quality value. The decision should be left to an operator who, on the basis of the picture impression, subjectively determines picture structures which appear to be suitable and uses or excludes them for the edge detection.

For the right decision to be taken by the operator, it may be helpful to insert at least one motion vector associated with the given picture area into the given picture areas of the displayed television picture. It is also helpful to give the given picture areas of the displayed television picture a different color, dependent on the fixed quality value, to distinguish the shape dependent on the fixed quality value, to frame the given picture areas of the displayed television picture as being distinct from other picture areas, or to represent the given picture areas of the displayed television picture as false colors so as to distinguish them from other picture areas.

Figure 4A:
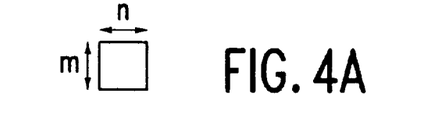
FIG. 4A and 4B are is a diagrammatic representation of the search areas of the block matchers.
Figure 4B:
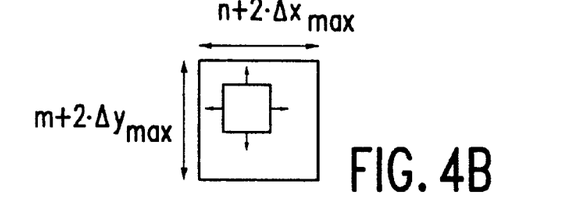

FIG. 4A and 4B show the principle of block matching. In accordance with FIG. 4A, a block of the size n*m is selected for motion measurement. This block will hereinafter be referred to as sample area. In contrast, a block (FIG. 4B) of the size of $(n+2*\Delta xmax)*(m+2\Delta ymax)$, in which $\Delta xmax$ and $\Delta ymax$ is the maximally detectable speed range, is denoted as the search area. In block matching, it is attempted to find the sample area within the larger search area. The position having the greatest similarity most probably represents the correct displacement. The similarity is measured via a displaced frame difference (DFD). At the greatest conformity, the DFD yields a minimum value and at absolute conformity it yields the value of zero.

Figure 5:
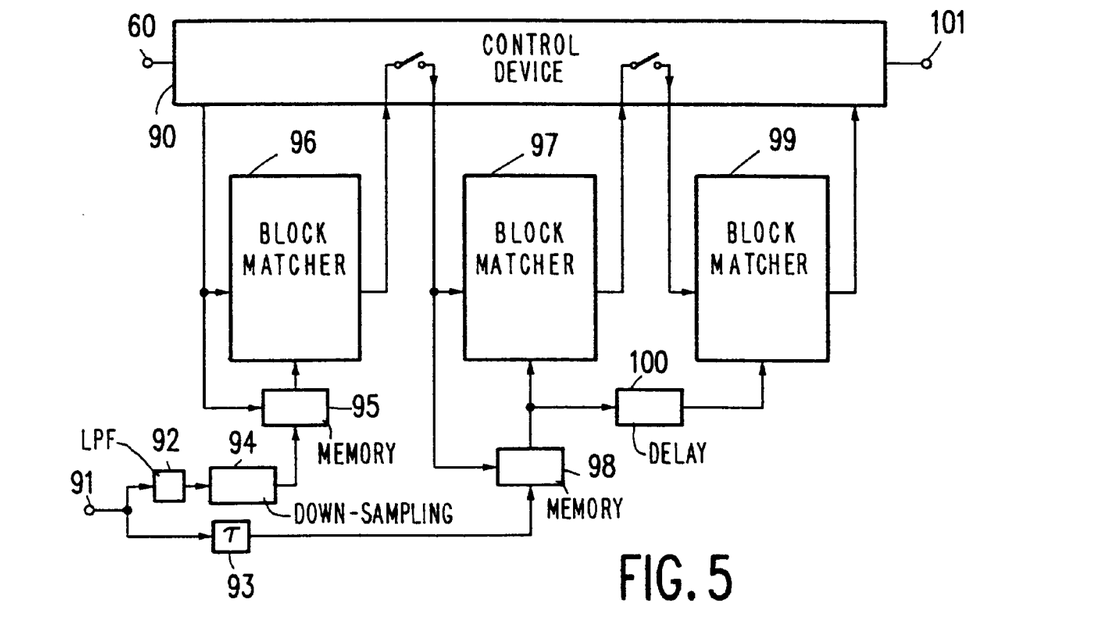
FIG. 5 shows the block diagram of the block matching arrangement.

The block diagram of FIG. 5 shows an embodiment of the block matching arrangement. In this arrangement, the signal processing, with reference to the different search areas, is not performed in parallel but serially. The edge signal generated by the edge detector is applied to the input of a control device 90 which may be implemented as a digital signal processor. The digital video signal generated by film scanning and subsequent A/D conversion by means of the A/D converter AD (FIG. 1), which signal is present in eight bits and at a data rate of 30 Mbyte/s at a terminal 91, is applied to the input of a low-pass filter 92 and to the input of a delay device 93.

The low-pass filter 92 serves to suppress alias effects which may be produced by subsequent down-sampling in a stage 94. Based on the downsampling, a digital video signal reduced to 5 Mbyte/s in data rate is available at the output of the stage 94, which signal comprises only every second pixel in the horizontal direction and only every third pixel in the vertical direction of the original quantity of pixels. The down-sampled digital video signal is applied to the input of a temporary memory 95 having an output which is connected to the input of a block matcher 96. For example, an integrated component of the type L 646720 (video motion estimation processor) of the firm of LSI may be used as a lock matcher 96, which component computes a full search block matching with a size of eight times eight pixels at a search range of minus four to plus three pixels in the horizontal and vertical directions and which can be cascaded. Both the block matcher 96 and the temporary memory 95 having a storage capacity of one frame are controlled by a correspondingly down-sampled edge signal supplied by the control device 90. The block matcher 96 performs large motion estimations in a search area which, based on the 3/2 down-sampling, has a size of twenty-four times sixteen pixels, the horizontal definition being two pixels and the vertical definition being three pixels.

A subsequently arranged block matcher 97 gives a greater precision of the definition up to the accuracy of one pixel. To this end, the motion vector signal, which can be supplied from an output of the block matcher 96, is first applied to the control device 90 and, after corresponding processing, further applied to the matcher 97 and a temporary memory 98 associated with the block matcher 97. The block matcher 97 may also be, for example of the type L 646720. However, in contrast to the block matcher 96, the block matcher 97 operates with the original picture data of the digital video signal obtained by film scanning. As a result, the temporary memory 98 associated with the block matcher 97 should receive the digital video signal delayed in the delay device 93. The delay device 93 has for its purpose to adapt the signal delay time of the digital video signal to the signal processing time of the block matcher 96.

The block matcher 97 performs motion estimations in a search area at the size of eight times eight, at which accuracy of one pixel is achieved.

To determine motions in a sub-pixel search area and to derive a corresponding motion vector signal, the motion vector signal generated by the block matcher 97 is further processed in a further block matcher 99. To resolve motions of one sixteenth of a pixel, the motion vector signal supplied by the block matcher 97 and processed in the control device 90 should be applied to the block matcher 99 which is video-controlled by the digital video signal which can be supplied from the output of the temporary memory 98 and is delayed by a delay device 100. The delay device 100 delays the video signal by two edge spacings. A motion vector signal in the sub-pixel search area, which signal can be supplied from the output of the block matcher 99, is applied to the control device 90 which applies an overall motion vector signal to a cluster device (not shown) at an output terminal 101.

Under the conditions mentioned above, the finally generated motion vector signal covers a search area of 32 pixels in the horizontal direction and of 96 pixels in the vertical direction, the definition being one sixteenth of a pixel. The embodiment of the block matching arrangement shown in FIG. 5 has the advantage that the motion vector signal is generated in real time, which, after further processing, can be used as an adjusting signal for film weave correction.

It is of course also possible to process video signals other than those generated by film scanning in accordance with the method according to the invention so as to achieve given trick effects or compensate for deficiencies caused by recording. For example, an operator may electronically mark a given, moving picture object on the screen of a monitor and use this picture object as a reference for frame stabilization so as to give this picture object a motion which deviates from the original recording for, for example, artistic reasons.

We claim:

1. A method of correcting picture steadiness errors in telecine scanning, in which light modulated by film frames is converted into a video signal and in which, with reference to the frame position, the picture component in the video signal is corrected by means of a correction signal, said method comprising the steps of:

(1) determining at least a sample area of the picture contents of the video signal obtained by film scanning by way of structure recognition of a frame, said sample area corresponding to a curvature in the picture contents;

(2) checking, by way of comparison, whether the determined sample areas are recognizable again in a search area of a sequential frame;

(3) generating motion vector signals when the sample areas are recognized again in the sequential frame, said motion vector signals defining the direction of motion and the extent of deviation of the position of the determined sample area from the position of the recognized sample area;

(4) determining parameters of a transform function by the motion vector signals;

(5) recognizing and eliminating motion vectors which correspond to partial motions by comparing the transform function with the motion vectors;

performing (4) and (5) several times, if necessary;

(6) deriving correction signals by taking the temporal sequence of the transform functions into account; and (7) applying these correction signals to a control device, said correction signals correcting the stability errors in the picture signals.

2. A method as claimed in claim 1, characterized in that, prior to performing step (2), said method further comprises the step subjecting a signal corresponding to the determined sample area to a low-pass filtering operation.

3. An arrangement for performing the method as claimed in claim 1, characterized in that said arrangement comprises:

a device for generating a structure signal, said generating device having an input to which the video signal of the film scanner is applied, and an output from which a structure signal can be supplied, said structure signal representing detected edges in the picture contents of the applied video signal;

a device which recognizes samples in the picture contents characterized by the structure signal in a sequential frame;

a device for generating a motion vector signal in dependence upon the direction and the extent of deviation of the position of detected edges from the position of recognized edges in the larger search area; and a device for deriving a signal for correcting steadiness errors, said deriving device having an input to which the generated motion vector signal is applied, and an output from which the signal for correcting steadiness errors can be supplied.

4. An arrangement as claimed in claim 3, characterized in that said arrangement comprises:

a first delay device having an input and an output, in which the input receives a digital video signal;

a second delay device having an input and an output, in which the input is connected to the output of the first delay device;

a first device for generating derivatives in the X and Y directions, having three inputs and three outputs, in which the inputs are respectively connected to inputs and outputs of the first and second delay devices and in which a video signal differentiated in the X direction is supplied from a first output, a video signal differentiated in the Y direction is supplied from a second output, and a sign signal is supplied from a third output;

a first device for squaring the video signal differentiated in the X direction;

a second device for squaring the video signal differentiated in the Y direction;

a first device for multiplying the video signals differentiated in the X and Y directions;

a third delay device having an input and an output, in which the input receives a signal generated by the first device for squaring the video signal;

a fourth delay device having an input and an output, in which the input is connected to the output of the third delay device;

a second device for generating derivatives in the X and Y directions, having three inputs and one output, in which the three inputs are respectively connected to inputs and outputs of the third and fourth delay devices and in which a signal (ksxx) differentiated in the X direction is supplied from the output;

a fifth delay device having an input and an output, in which the input receives a signal obtained from the device, as well as the sign signal;

a sixth delay device having an input and an output, in which the input is connected to the output of the fifth delay device;

a third device for generating derivatives in the X and Y directions, having three inputs and one output, in which the three inputs are respectively connected to inputs and outputs of the fifth and sixth delay devices and in which a signal differentiated in the X,Y directions is supplied from the output;

a seventh delay device having an input and an output, in which the input receives a signal obtained from the second squaring device;

an eighth delay device having an input and an output, in which the input is connected to the output of the seventh delay device;

a fourth device for generating derivatives in the X and Y directions, having three inputs and one output, in which the three inputs are respectively connected to inputs and outputs of the seventh and eighth delay devices and in which a signal differentiated in the Y direction is supplied from the output;

a third device for squaring the signal generated by the third device for generating derivatives in the X and Y directions;

a second device for multiplying the signal generated by the second device for generating derivatives in the X direction, and the signal generated by the fourth device for generating derivatives in the X direction; and a device for generating the structure signal, having two inputs and one output, in which one input receives the signal generated by the third squaring device and the other input receives the signal generated by the second multiplier device, and in which the structure signal is supplied from the output.

5. An arrangement as claimed in claim 4, characterized in that the signals supplied by the first and second squaring devices and the signal supplied by the first multiplier device are applied via a rounding device, the signals supplied by the second, third and fourth devices for generating derivatives are applied via a normalization device, the device for generating the structure signal comprises:

a device for subtracting the signal generated by the third squaring device from the signal generated by the second multiplier device (51) thereby forming a difference;

a device for forming a logarithm of the difference obtained from the subtracting device;

a device for multiplying the logarithm by 2 and for subtracting therefrom the logarithmic value of the signal generated by the second multiplier device; and at least a device which allows a spatial and/or video level selection of given structures in the generated structure signal.

6. An arrangement as claimed in claim 3, characterized in that the device for generating a motion vector signal comprises:

a control device having inputs and outputs, in which one of the inputs receives the structure signal, and the motion vector signal is supplied from one of the outputs;

a first block matcher having a video signal input which receives a temporarily stored down-sampled video signal, a position signal input which receives a down-sampled structure signal, and an output from which a first motion vector signal is supplied;

a second block matcher having a video signal input which receives a temporarily stored non-down-sampled video signal, a position signal input which receives the first motion vector signal, and an output from which a second motion vector signal is supplied;

a third block matcher having a video signal input which receives a temporarily stored, delayed, non-down-sampled video signal, a position signal input which receives the second motion vector signal, and an output from which a third motion vector signal is supplied, said third motion vector signal being applied to one of the inputs of the control device;

a device for low-pass filtering the video signal generated by the film scanner;

a device for down-sampling the signal supplied by the low-pass filtering device;

a first device for controlled storage of a down-sampled video signal supplied by the down-sampling device; and a second device for controlled storage of a video signal delayed by a delay device.

7. A method as claimed in claim 1, characterized in that, in determining the sample area, a signal processing operation is performed which, with regard to the resolution of data words, processes the data word values in a floating point representation and further processes the obtained intermediate values in an n-bit wide mantissa exponent representation, while of the values of the mantissa exponent representation, only the values of the exponents for the further signal processing operation are taken as a basis, and the mantissa is normalized before a conversion of values of the floating point representation into values of a mantissa exponent representation.

8. A method as claimed in claim 1, characterized in that, for determining the sample area, individual and/or several signal components of the video signal obtained by film scanning are influenced in amplitude as against other signal components in the video signal.

9. A method as claimed in claim 8, characterized in that, for determining the sample area, given color components of the video signal obtained by film scanning are matrixed with selectable coefficients.

10. A method as claimed in claim 1, characterized in that, for determining the sample area, the video signal obtained by film scanning is subjected to a spatial and/or temporal filtering operation.

11. A method as claimed in claim 1, characterized in that given areas in a television picture produced by displaying the video signal obtained by film scanning are excluded or not excluded from a signal processing operation for determining the sample area.

12. A method as claimed in claim 11, characterized in that the given picture areas in the displayed television picture are automatically excluded from determining the sample area, dependent on the picture structure of the picture contents of the video signal obtained by film scanning.

13. A method as claimed in claim 12, characterized in that the picture structures in the picture contents of the video signal obtained by film scanning are evaluated, quality values are fixed for the picture areas covered by the evaluation, and the picture area associated with the quality value is either taken into account or excluded when determining the sample area, dependent on the extent of the fixed quality value.

14. A method as claimed in claim 11, characterized in that at least one motion vector associated with the given picture area is inserted into the given picture areas of the displayed television picture.

15. A method as claimed in claim 13, characterized in that the given picture areas of the displayed television picture have a different shape or color, dependent on the fixed quality value.

16. A method as claimed in claim 13, characterized in that the given picture areas of the displayed television picture are shown within frames or in false colors so as to distinguish them from other picture areas.

17. A method as claimed in claim 1, characterized in that the film is scanned in such a way that video signals of n partially overlapping fields are generated, in which n is a positive integer, and at least a sample area corresponding to an edge in the picture contents is determined in the picture contents of each generated video signal.

18. A method as claimed in claim 1, characterized in that a plurality of determined local motion vectors is combined to a cluster, and a center of gravity is determined for each cluster.

19. A method as claimed in claim 18, characterized in that the operation of combining local motion vectors is based on fuzzy sets.

20. A method as claimed in claim 18, characterized in that a quality value is assigned to each cluster, and clusters which are below a given quality threshold, are excluded from the steadiness error correction.

21. A method as claimed in claim 18, characterized in that an approximation for determining model parameters for a transform function is formed from values of a plurality of clusters, while for determining partial displacements, the determined transform function is compared with the set of clusters, and partial displacements determined by said comparison are excluded from steadiness error correction.

22. A method as claimed in claim 1, characterized in that, at a start of a picture scene, a correction signal is essentially transmitted in an unfiltered form, and the signal is low-pass filtered after a predetermined number of film frames.

23. A method as claimed in claim 1, characterized in that the signal for correcting steadiness errors is used for sequences of input pictures of the video signal obtained by film scanning, in which an oversampled filter matrix is applied at positions of the input pictures, and a high-resolution sub-pixel line is used as a filter matrix, which line is imaged in two dimensions in the filter matrix.

* * * * *